US005150876A

United States Patent [19]

Pickard

[11] Patent Number: 5,150,876

[45] Date of Patent: Sep. 29, 1992

[54] SERVO VALVE

[76] Inventor: Gerald W. Pickard, Bishops Waltham, Southhampton SO3 1RS, England

[21] Appl. No.: 698,906

[22] Filed: May 13, 1991

[30] Foreign Application Priority Data

May 12, 1990 [GB] United Kingdom ................. 9010706

[51] Int. Cl.[5] ........................ F16K 11/02; F16K 31/16

[52] U.S. Cl. ........................................ 251/14; 137/117; 251/129.03

[58] Field of Search ............................ 137/117, 625.64; 251/14, 129.03

[56] References Cited

U.S. PATENT DOCUMENTS 3,101,650 8/1963 Blanton ...................... 137/625.64 X
3,563,262 2/1971 Wood .................................. 137/117
4,157,366 6/1979 Ruth et al. ................. 251/129.03 X
4,226,344 10/1980 Booth et al. ............... 251/129.03 X
4,385,642 5/1983 Robinson .................. 251/129.03 X

FOREIGN PATENT DOCUMENTS 916973 1/1963 United Kingdom .
942123 11/1963 United Kingdom .
1140583 1/1969 United Kingdom .
2040509 8/1980 United Kingdom .

*Primary Examiner*—Stephen M. Hepperle
*Attorney, Agent, or Firm*—Young & Thompson

[57] ABSTRACT

A servo valve comprises an electrical winding, an armature, flapper means fixed to the armature and a feedback arrangement including a radially extending plug fixed to an end of one of the arms of the flapper arrangement. The plug is located within the fluid flow of a supply bore and is deflected according to the flow. This deflection is passed back to the flapper to vary its position relative to the jet pipe nozzles thus offering feedback control.

2 Claims, 3 Drawing Sheets

SERVO VALVE

FIELD OF THE INVENTION

This invention relates to a servo valve, and in particular, a servo valve for use in association with a low pressure fluid flow system and a high pressure fluid flow system simultaneously.

BACKGROUND OF THE INVENTION

In conventional servo valve design the servo valve used in a fluid flow system, has provided in association therewith:

a spool valve; and a restrictor arrangement in a hydraulic fluid system which effects movement and control of the spool in the spool valve.

In operation an input current is applied to a torque motor in order to generate a torque which displaces an armature and thereby a flapper means attached thereto. The displacement of the flapper means creates a pressure imbalance in the hydraulic fluid system controlling the position of the spool within the spool valve, in response to which the spool in the spool valve is moved.

The movement of the spool in the spool valve causes the adjustment of a force resulting from the fluid flow through the system exerted upon the servo valve in a feedback arrangement which is linked to the armature. Eventually, an equilibrium position is reached where the torque generated by the torque motor and force exerted by the fluid flow through the system are equal and opposite. This provides a unique relationship between current input to the servo valve and the desired fluid flow through the servo valve.

In order for this system to operate properly a supply of high pressure fluid referenced to a low pressure fluid should be provided. The difference between the high pressure fluid and the low pressure fluid being used to control the position of the spool in the spool valve.

In operation the desired fluid flow in the high pressure side of the servo valve should not be allowed to leak into the low pressure side of the servo valve. If this happens large inaccuracies in the desired fluid flows from the servo valve will result. In the past any attempts to provide sealing between the high and lower pressure system has proved extremely difficult due to the necessary movement required in the feedback arrangement.

With conventional designs of servo valve it is very difficult to use the servo valve in association with a low pressure fluid flow system and a high pressure fluid flow system simultaneously, and in any event will add considerable weight and volume to the servo valve used in the system.

As will be appreciated by those in the aerospace industry weight and space are at a premium on an aircraft.

SUMMARY OF THE INVENTION

The present invention is concerned with providing a servo valve which may be used with a high pressure fluid flow system and a lower pressure fluid flow system simultaneously without considerably increasing the weight and space occupied by the servo valve.

In accordance with the present invention a servo valve includes:

at least one electrical winding;

an armature;

a flapper means securely fixed to the armature; and a feedback arrangement attached to the flapper means; wherein the flapper means has two arms which protrude outwardly from the remainder of the servo valve, the ends of which arms are spatially independent from one another and to the end of one of which arms the feedback arrangement is attached.

In a preferred arrangement of the present arrangement the flapper means extends through the armature so that in side profile the armature and flapper means have a cross-shaped or crucifix form.

The spatial independence of the two arms of the flapper means enables the arms to be connected, or used, in two flow systems at differing pressures, i.e. one at high pressure and a second at a lower pressure with respect thereto without the potential of leakage between the two flow systems.

In accordance with a second aspect of the present invention a fluid flow control system comprises:

a servo valve made in accordance with the present invention;

a spool valve, the position of the spool in which is controlled by the servo valve; and a feedback arrangement including a flow feedback member, the movement of which is dependent on the fluid flow through the system.

In a preferred embodiment of the present invention the flow feedback element comprises a plug means mounted within a tapered body, so that the relative position of the plug means in the tapered body provides an indication of the flow of fluid through the system. It should be noted that the position of the plug means is a direct consequence of the difference between the quantity of the fluid supplied to the system and the quantity of fluid removed from the system via the spool valve.

Under equilibrium conditions the torque generated by a torque motor of the servo valve in response to an input signal/current is balanced by a force applied to the flow feedback element by the flow of fluid through the system. In order to adjust the proportion of fluid flowing through the system via the feedback flow element and that passing through the spool valve, an input signal is passed to the servo valve which causes the position of the flow feedback element to be adjusted. This causes a pressure imbalance in the system resulting in the position of the spool in the spool valve being adjusted until equilibrium is once again achieved.

In an alternative arrangement of the present invention the feedback flow element comprises a piston and nozzle arrangement, in which the piston is moveable with respect to the nozzle so as to impede the flow of fluid through the nozzle. In certain forms of the arrangement, the piston is moved directly as a result of the fluid flowing through the servo valve system. In one particular form the position of the piston with respect to the nozzle is directly controlled by the armature and flapper means of the servo valve, and the movement of the piston is induced by movement of the armature and thereby the flapper means.

In the second form of this piston and nozzle arrangement the piston is connected indirectly, for example by means of a spring, to one arm of the flapper means and thereby the armature. In this case the spring acts to reduce/damp out fluctuations in the movement caused by the servo valve.

In accordance with a third aspect of the invention the fluid flow system described above is used as the fuel supply system to an aircraft.

BRIEF DESCRIPTION OF THE DRAWINGS

The invention will now be illustrated by way of description, of an example, with reference to the accompanying drawings in which.

Figure 1:
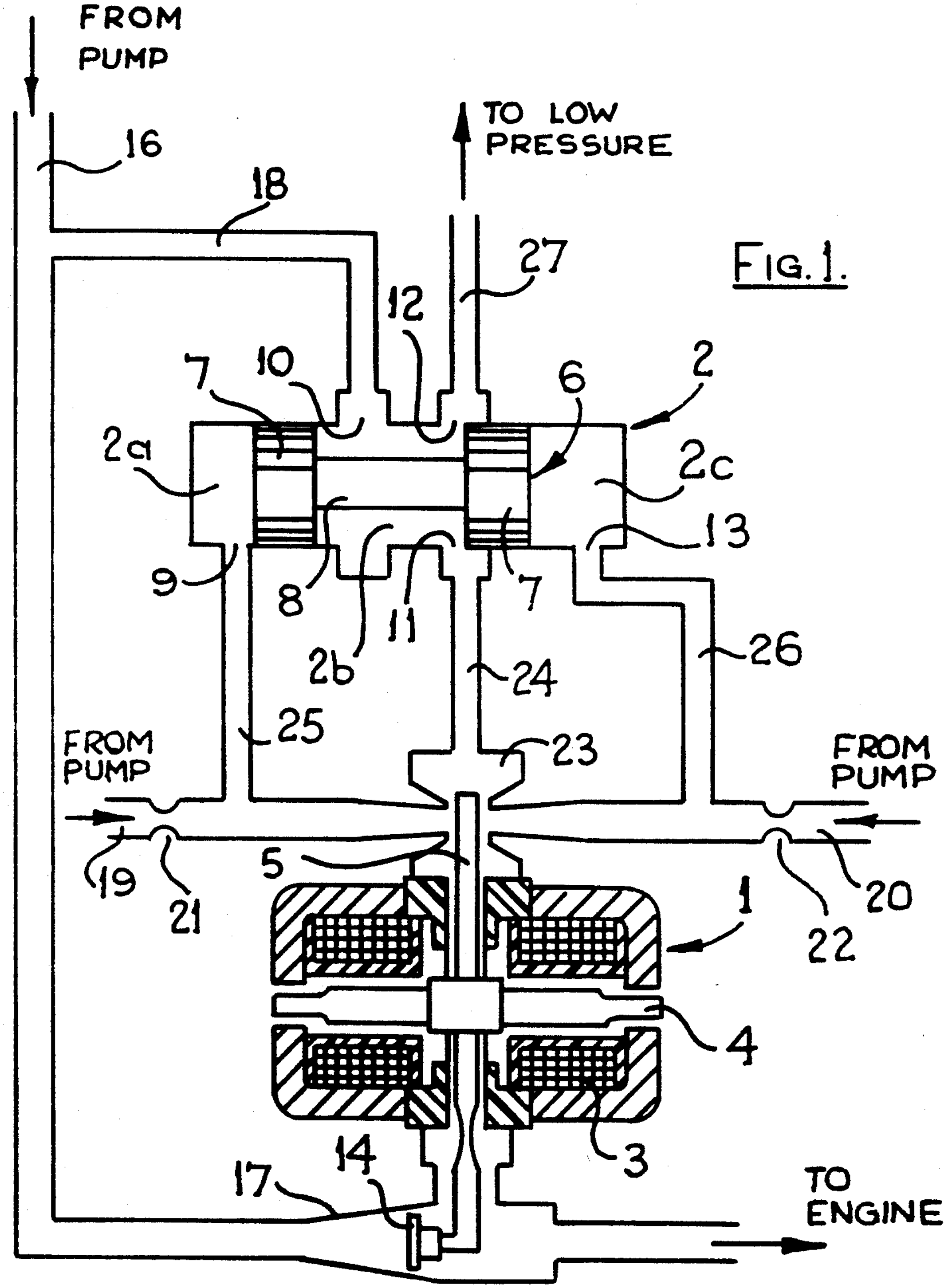
FIG. 1 shows a schematic layout of a system made in accordance with the present invention.

FIG. *2a* shows a schematic view of an alternative feedback arrangement for in the system shown in FIG. 1; and FIG. *2b* shows a schematic view of a second alternative feedback arrangement for use in the system shown in FIG. 1

DETAILED DESCRIPTION OF THE INVENTION

Now referring to FIG. 1 of the drawings a fuel supply control system, in accordance with the present invention, for use with a small engined aircraft, comprises:

a servo valve 1 made in accordance with the present invention;

a two landed spool valve 2; and a feedback arrangement which provides a feedback signal proportional to the flow of fuel through the system and into the engine.

The servo valve 1 comprises:

two electrical windings 3;

an armature 4 which extends through openings in the windings 3; and a flapper means 5 which extends between the windings 3.

The flapper means 5 extends through an orifice provided in the armature 4 so that the flapper means 5 and the armature 4 in combination have a cross-shaped or crucifix side profile, and are interconnected so as to form an effectively solid member.

Both of the arms of the flapper means 5 extend out of the body of the servo valve 1.

The spool valve 2 includes a spool member 6 having two landed sections 7 which are interconnected by a rod section 8, and has five ports 9, 10, 11, 12 and 13. The spool member 6 divides the body of the spool valve 2 into which it is mounted into three distinct chambers *2a*, *2b* and *2c*.

The feedback arrangement which provides a feedback signal proportional to the flow of fuel into the engine, in this particular example, comprises a plug means 14. The plug means 14 is moveable within a tapered section of line so as to vary the flow area available for the flow of fuel through the system to the engine. For every position of the feedback arrangement, i.e. plug means 14, in the tapered section of the line a torque is generated, this torque is proportional to/-dependent upon the position of the plug means 14 in the tapered section of the line, and therefore the fluid flow to the engine.

The plug means 14 is mounted at one end, the end extending from the servo valve, of one of the arms of the flapper means and the position of the plug means in the tapered section of line provides a force by the action of the fuel flow there against which balances the torque generated by the servo valve.

A main line 16 runs through the system. One end of the main line 16 is connected to the output side of a fuel pump (not shown), therefore delivers fuel at relatively high pressure to the system. The other end of the main line 16 is connected to the engine and therefore acts as the output line from the system.

The main line 16 is provided with a tapered section 17 into which the plug means 14 is placed. One end of the flapper means 5 extending into the main line 16 to directly effect control of the position of the plug 14.

A branch line 18 extends from the main line 16 and connects with port 10 of the spool valve 2 and thereby is in communication with the chamber *2b* of the spool valve 2.

Fuel at high pressure is also delivered to the system via lines 19 and 20, each of which lines is provided with a restrictor 21, 22 respectively. The lines 19 and 20 open on diametrically opposed sides of a chamber 23, into which the other end of the flapper means 5 of the servo valve 1 extends so as to impede the flow of fluid from either of the lines 19 and 20 as desired.

The chamber 23 is provided with a line 24 which connects the chamber 23 with port 11 of the spool valve 2 and thereby chamber *2b* thereof, and therefrom to a low pressure reference source.

A line 25 connects the line 19 at a position between the chamber 23 and the restrictor 21 to the port 9 of the spool valve 2 and thereby the chamber *2a* of the spool valve 2.

A line 26 connects the line 20 at a position between the chamber 23 and the restrictor 22 to the port 13 of the spool valve and thereby the chamber *2c* of the spool valve.

A line 27 extends from the port 12 of the spool valve 2, and therefore effectively the chamber *2b* and connects the system to a low pressure reference source.

In operational conditions the plug 14 and therefore that particular end of the flapper means 5 is in a high pressure environment, whilst the other end of the flapper means 5 is in a relatively low pressure environment.

The flow of fuel to the engine is controlled by varying an electrical input to the windings 3 of the servo valve. This causes the torque generated by the servo valve to be altered, and therefore the position of the armature, and thereby flapper means 5 and plug means 14 to be adjusted.

As a consequence the pressure of the fluid in the lines 25 or 26 is varied by the restriction by the flapper means of the nozzles present in the chamber 23, causing a pressure imbalance across the spool 6 of the spool valve 2.

In response to the pressure imbalance the spool 6 moves within the spool valve so adjusting the amount of fuel flowing through the spool valve, and by passing the engine, so varying the fuel supply to the engine. In turn this causes the force exerted upon the plug means by the flow of fuel to be varied, eventually the system will reach equilibrium where the torque generated by the servo valve counteracts the force exerted by the fuel flow.

Now referring to FIG. 2 of the drawings, alternative forms of the feedback arrangement to provide a feedback signal proportional to the fuel flow through the system are shown. Like numerals have been used to describe like components.

In FIG. *2a*, a moveable piston 28 is mounted in the main line 16 so that it restricts, to a varying degree, the flow of fuel through a nozzle 29 and thereby to the engine. The movement of the piston 28 is directly related to the pressure balance across the nozzle 29, and this is modulated by the flapper means of the servo valve.

Figure 2A:
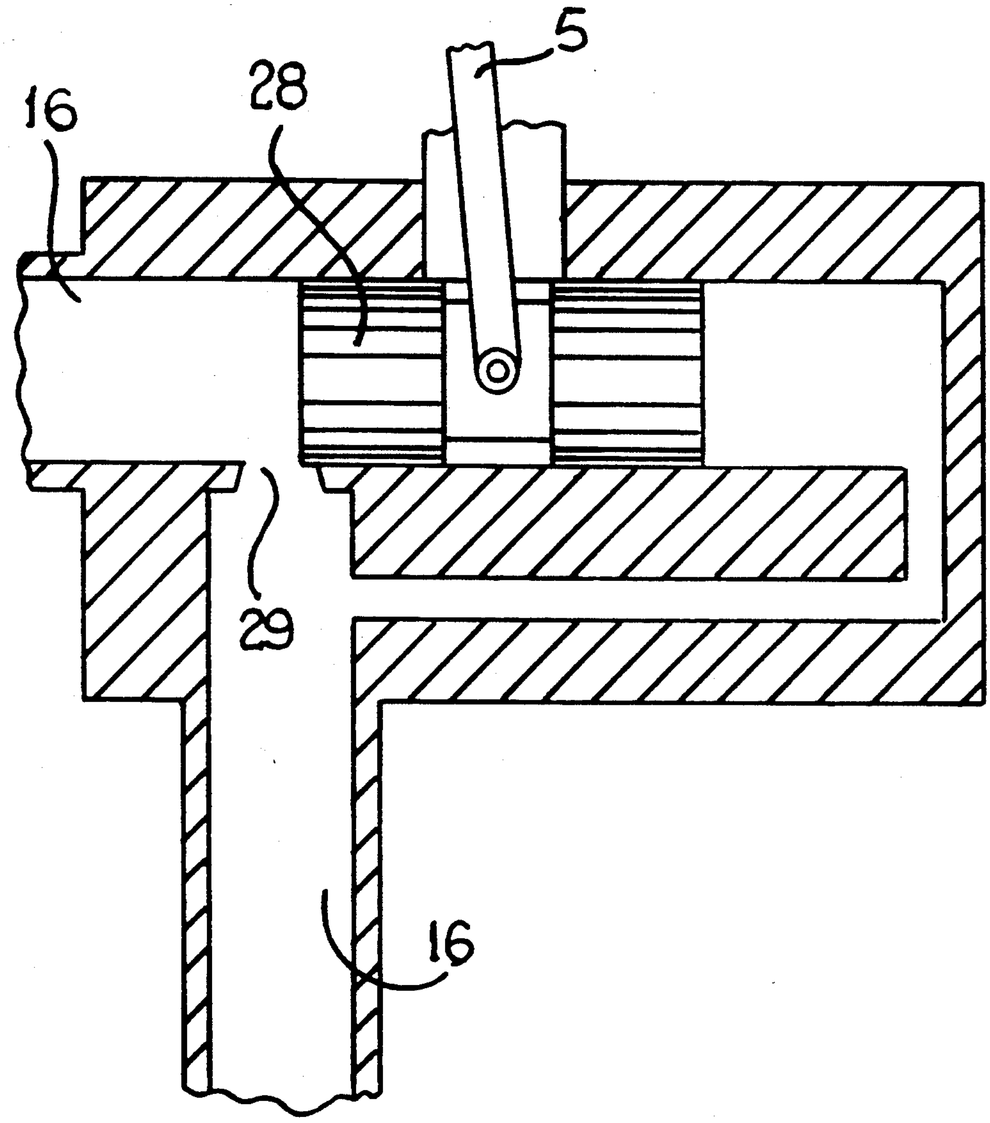
Figure 2B:
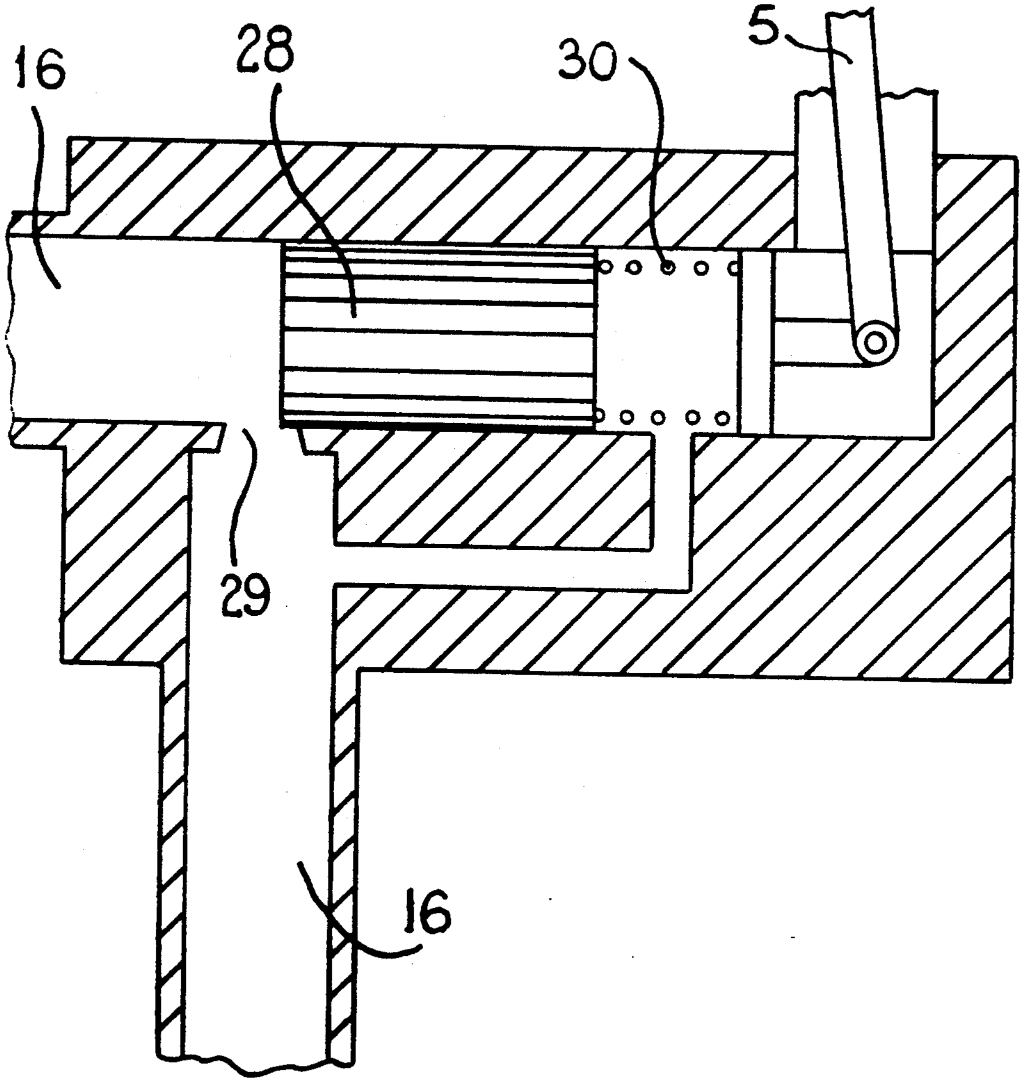

In FIG. 2*b*, a similar arrangement to that shown in FIG. 2*a* is used. However, in this case instead of a direct connection between the piston 28 and the flapper means 5 of the servo valve 1, a spring 30 is used to interconnect the piston 28 and the flapper means 5. With this particular example of the means to meter the flow of fuel, the spring 30 provides some damping to the fluctuations which may be present in the system.

I claim:

1. A servo valve for controlling a flow of fluid in a bore including:

at least one electrical winding;

an armature;

a flapper means securely fixed to the armature; and a feedback arrangement comprising a radially extending plug attached to the flapper means:

wherein the flapper means has two arms which protrude outwardly from the armature, the ends of which arms are spatially independent from one another and to the end of one of which arms the feedback arrangement is attached such that said plug is located within a tapering portion of said bore, fluid flow in the bore causing deflection of the plug and the end of the other arm comprises a valve.

2. A servo valve as claimed in claim 1 wherein said one arm has a relatively weakened portion to damp the deflection of the plug.

* * * * *